US012521228B2

(12) United States Patent
Egnelöv et al.

(10) Patent No.: US 12,521,228 B2
(45) Date of Patent: Jan. 13, 2026

(54) TUBULAR MESH SUPPORT DEVICE WITH DIFFERENT CIRCUMFERENTIAL AREAS

(71) Applicant: NOVUS SCIENTIFIC AB, Uppsala (SE)

(72) Inventors: Per Egnelöv, Uppsala (SE); Torbjörn Mathisen, Älvsjö (SE)

(73) Assignee: NOVUS SCIENTIFIC AB, Uppsalla (SE)

( * ) Notice: Subject to any disclaimer, the term of this patent is extended or adjusted under 35 U.S.C. 154(b) by 690 days.

(21) Appl. No.: 17/911,097

(22) PCT Filed: Feb. 23, 2021

(86) PCT No.: PCT/EP2021/054412
§ 371 (c)(1),
(2) Date: Sep. 12, 2022

(87) PCT Pub. No.: WO2021/180459
PCT Pub. Date: Sep. 16, 2021

(65) Prior Publication Data
US 2023/0146304 A1  May 11, 2023

(30) Foreign Application Priority Data
Mar. 13, 2020 (SE) ................ 2050274-6

(51) Int. Cl.
*A61F 2/12* (2006.01)
*A61F 2/00* (2006.01)

(52) U.S. Cl.
CPC .............. *A61F 2/12* (2013.01); *A61F 2/0077* (2013.01); *A61F 2220/0008* (2013.01); *A61F 2230/0069* (2013.01); *A61F 2250/0031* (2013.01)

(58) Field of Classification Search
CPC ................ A61F 2/12; A61F 2230/0069; A61F 2250/0031; A61F 2210/0004;
(Continued)

(56) References Cited

U.S. PATENT DOCUMENTS

| 4,936,858 A * | 6/1990 | O'Keeffe | A61F 2/12 623/8 |
| 6,875,233 B1 * | 4/2005 | Turner | A61F 2/12 623/8 |

(Continued)

FOREIGN PATENT DOCUMENTS

| EP | 2 915 505 A1 | 9/2015 |
| EP | 3 085 337 A1 | 10/2016 |

(Continued)

OTHER PUBLICATIONS

International Search Report in PCT Application No. PCT/EP2021/054412, Jun. 2, 2021.

(Continued)

*Primary Examiner* — Suzette J Gherbi
(74) *Attorney, Agent, or Firm* — Foley & Lardner LLP (57) ABSTRACT

The invention relates to a mesh support device (10; 20) for supporting a breast implant (30), wherein the mesh support device (10; 20) is tubular and comprises a first circumferential mesh area (11; 21), which is characterized by a first set of mesh characteristics and which has a first circumferential length, and a second circumferential mesh area (12; 22), which is characterized by a second set of mesh characteristics and which has a second circumferential length, the first set of mesh characteristics being different from the second set of mesh characteristics. The invention relates also to a breast implant device comprising the breast implant (30) and the mesh support device (10; 20).

18 Claims, 3 Drawing Sheets

(58) Field of Classification Search
CPC .......... A61F 2250/0018; A61F 2/0063; A61F 2002/0068
See application file for complete search history.

(56) References Cited

U.S. PATENT DOCUMENTS

| | | | |
|---|---|---|---|
| 7,875,074 B2 | 1/2011 | Chen et al. | |
| 8,016,841 B2 | 9/2011 | Magnusson et al. | |
| 8,083,755 B2 | 12/2011 | Mathisen et al. | |
| 9,566,370 B2 | 2/2017 | Mathisen et al. | |
| 10,363,127 B2* | 7/2019 | Mlodinow | A61F 2/12 |
| 2011/0257665 A1* | 10/2011 | Mortarino | D04B 21/08 |
| | | | 606/151 |
| 2011/0257761 A1* | 10/2011 | Mortarino | D04B 1/22 |
| | | | 623/23.72 |
| 2013/0253645 A1* | 9/2013 | Kerr | A61F 2/12 |
| | | | 623/8 |
| 2013/0304098 A1* | 11/2013 | Mortarino | A61F 2/12 |
| | | | 606/151 |
| 2016/0331504 A1 | 11/2016 | Wang et al. | |
| 2017/0181841 A1 | 6/2017 | Weinzweig | |
| 2022/0296359 A1* | 9/2022 | Egnelöv | A61F 2/12 |
| 2025/0169859 A1* | 5/2025 | Armstrong | A61B 17/7035 |

FOREIGN PATENT DOCUMENTS

| | | |
|---|---|---|
| WO | WO-2014/149096 A1 | 9/2014 |
| WO | WO-2017/192505 A1 | 11/2017 |
| WO | WO-2018/199929 A1 | 11/2018 |

OTHER PUBLICATIONS

Office Action in Swedish Application No. 2050274-6, Oct. 18, 2021.
Search Report in Swedish Application No. 2050274-6, Oct. 29, 2020.

\* cited by examiner

TUBULAR MESH SUPPORT DEVICE WITH DIFFERENT CIRCUMFERENTIAL AREAS

FIELD OF THE INVENTION

The present invention relates generally to a medical support device for supporting a breast implant and relates particularly to a mesh support device for supporting a breast implant, wherein the mesh support device—before implantation of the mesh support device and the breast implant in a human body—has a tubular shape and comprises at least two circumferential mesh areas having different mesh characteristics. The invention also relates to a breast implant device comprising a breast implant and a tubular mesh support device with at least two circumferential mesh areas having different mesh characteristics.

BACKGROUND OF THE INVENTION

A medical breast reconstruction is a procedure that typically involves the use of prosthetic breast implants, e.g. silicone or saline implants, which are placed either inside or outside the breast muscle, to recreate a female breast. Within the art of reconstructive and cosmetic breast surgery, it is further common to at least partly place the breast implant in a support device. The support device can then be attached, e.g. stitched, to the human breast tissue to thereby fixate the position of the breast implant, or the support device can simply provide a structure for facilitating and promoting tissue integration.

Support devices for breast implants come in many types and designs but are typically made from a mesh material and have a flat back wall and a concave front wall. The mesh material used can be a permanent mesh material or can be made from a biodegradable material. Examples of support devices are disclosed in the published U.S. Patent Application No. 2013/0304098 to Mortarino, which relates to a three-dimensional fabric structure in the form of a pocket in which the breast implant is to be placed. Similar support devices are further disclosed in the U.S. Pat. No. 7,875,074 to Chen et al., wherein the support devices comprise a concave receiving space, which is defined by a back wall and a front wall for at least partly receiving and supporting a breast implant therein.

A common feature of the known support devices for breast implants is that they provide a pocket in which the breast implant is to be placed. However, as stated above, breast implants come in several sizes and also shapes, which means that several support devices having pockets with corresponding sizes and shapes must be kept in store, which in itself poses a logistical problem, since a support device, which often is made from a bio-degradable material, typically has an expiry date that must not be exceeded.

Further, even if the size and shape of particular support device is well fitted to a specific breast implant, there is—due to the pocket-like shape—always a certain mismatch between the round or more or less hemispherically shaped breast implant and the outer rim area of the receiving pocket, i.e. the breast implant does not completely fill out the space where a back wall of the support device meets the front wall, which makes it difficult to exactly position the breast implant. Furthermore, many existing support devices for breast implants are by doctors and surgeons perceived to have a design that is too elaborated to be optimal from a medical perspective, i.e. the support devices require extra attention and special handling during the implantation procedure. Needless to say, any medical device which has a design that is not optimal from a medical perspective implies a certain risk for the patient.

Although a support device according to the prior art may serve its intended purpose well, it is still accompanied by problems related to its adaption to the size and shape of the breast implant that is to be supported by the support device in question. The known support devices are typically also associated with disadvantages when it comes to user-friendliness, i.e. how easy they are to handle by doctors and surgeons during an implantation procedure. A general object of the present invention is therefore to provide an improved support device for a breast implant, which support device has a design and shape that can be well and easily adapted to a span of different implant sizes and shapes. Another object of the invention is to provide an improved support device which is easy to handle during a medical implantation procedure. A further object of the invention is to provide an implant device comprising a breast implant and an improved support device.

SUMMARY OF THE INVENTION

The above-mentioned objects are achieved by the present invention according to the independent claims. Preferred embodiments are set forth in the dependent claims.

In a first aspect, the invention relates to a mesh support device for supporting a breast implant, wherein the mesh support device is tubular and comprises a first circumferential mesh area, which is characterized by a first set of mesh characteristics and which has a first circumferential length, and a second circumferential mesh area, which is characterized by a second set of mesh characteristics and which has a second circumferential length, the first set of mesh characteristics being different from the second set of mesh characteristics, wherein each of the first circumferential length and the second circumferential length forms a part of the total circumferential length of the mesh support device. When there are two circumferential mesh areas provided in the mesh support device, the first circumferential length of the first circumferential mesh area is defined by an angle α and that the second circumferential length of the second circumferential mesh area is defined by 360°-α, which angle α is in the interval of 20°<α<180°, and more preferably 60°<α<180°, and even more preferably 80°<α<180°.

By providing at least two circumferential mesh areas having different mesh characteristics, the first circumferential mesh area can be optimized for one specific requirement for the mesh support device, whereas the second circumferential mesh area can be optimized for another specific requirement for a mesh support device. In one embodiment of the invention, the first set of mesh characteristics of the first circumferential mesh area comprises characteristics that enhance adaption to different breast implant sizes, which here is expressed as a distension higher than 8%. In embodiments of the invention, the second set of mesh characteristics of the second circumferential mesh area comprises characteristics that promote tissue integration, which here is expressed as a distension less than 8% and/or an area density in the interval of 40 to 180 g/cm². The second set of mesh characteristics can also comprise characteristics that promote tissue regeneration. For a degradable mesh, this can be the time for onset of decline of mechanical properties, which, according to the invention, should be less than 30 days, and more preferably less than 14 days, after the time of implantation. For a degradable mesh or a degradable mesh area, the term "distension" means "initial distension", i.e. the distension as measured before the onset of any mechanical degradation.

According to the invention, the mesh support device can comprise more than two circumferential mesh areas; and in one embodiment, the mesh support device comprises a third circumferential mesh area, which is characterized by a third set of mesh characteristics and which has a third circumferential length, the third set of mesh characteristics being different from the first set of mesh characteristics and from the second set of mesh characteristics, and comprises a fourth circumferential mesh area, which is characterized by said third set of mesh characteristics and which has a fourth circumferential length, and where the third and fourth circumferential mesh areas are located on opposite sides of the first circumferential mesh area, wherein each of the third circumferential length and the fourth circumferential length forms a part of the total circumferential length of the mesh support device. In this latter case, the mesh characteristics of the third and fourth circumferential mesh areas can be tailored to meet specific requirements related to, for example, the mesh areas that hold and are in contact with the rim of a breast implant, as will be described below.

In further embodiments of the invention, the mesh support device is made by a knitting or weaving technique that prevents unraveling. In still further embodiments, both the first and second circumferential areas of the mesh support device are made from one or more bio-degradable materials. By manufacturing a mesh support device by means of an unraveling-preventing knitting or weaving technique, a more reliable mesh support device is provided, which can be fixedly anchored, e.g. sutured, stitched or stapled, to human breast tissue; and by making the mesh support device from one or several bio-degradable materials, long-term complications, which may be associated with permanent mesh materials, can be avoided. According to one embodiment, at least one of the first and second circumferential areas of the mesh support device can be made from two different bio-degradable materials having different degradation times, something which can promote tissue integration as the at least one circumferential area of the mesh support device gradually degrades over time.

In a second aspect, the invention relates to a breast implant device for implantation in a human body, comprising a breast implant and a mesh support device, in which the breast implant is positioned, wherein the mesh support device is tubular and comprises a first circumferential mesh area, which is characterized by a first set of mesh characteristics and which has a first circumferential length, and a second mesh circumferential area, which is characterized by a second set of mesh characteristics and which has a second circumferential length, the first set of mesh characteristics being different from the second set of mesh characteristics, wherein each of the first circumferential length and the second circumferential length forms a part of the total circumferential length of the mesh support device. In one embodiment of the breast implant device, the breast implant has a rounded frontside and an essentially flat backside and the mesh support device covers both the frontside and the backside and has been folded backwards to lie essentially parallel with the backside of the breast implant. By this configuration, the breast implant, which can be made from silicone filled with silicone gel or saline, or a combination thereof, is always provided with a fixed and firm support from one side, which side, when implanted, constitutes the underside of the breast implant device. In one embodiment, the first circumferential mesh area covers the backside of the breast implant, while the second circumferential area covers the frontside of the breast implant. The preparation of such a breast implant device can be performed in connection with a medical implant procedure, or can be done in long advance such that the breast implant and the mesh support device are sterilized and packaged together.

A mesh support device according to the present invention is a soft and pliable object, which furthermore can possess some distension. Throughout this application, the term "tubular", when used to describe the shape of a mesh support device according to the invention, is therefore defined as the basic or nominal shape of the mesh support device, i.e. the mesh support device can (i.e. is able to) assume a tubular shape; for example when being threaded over a cylindrical object having the same diameter as the mesh support device, but it is not necessary that the mesh support device actually has a tubular shape throughout its life time, or even at any time during its lifetime.

BRIEF DESCRIPTION OF THE DRAWINGS

FIG. 1b illustrates schematically a cross-sectional top-view of the tubular mesh support device in FIG. 1a;

FIG. 2b illustrates schematically a top-view of the breast implant in FIG. 2a;

FIG. 3b illustrates schematically a top-view of the intermediate configuration shown in FIG. 3a;

DETAILED DESCRIPTION OF PREFERRED EMBODIMENTS

Figure 1A:
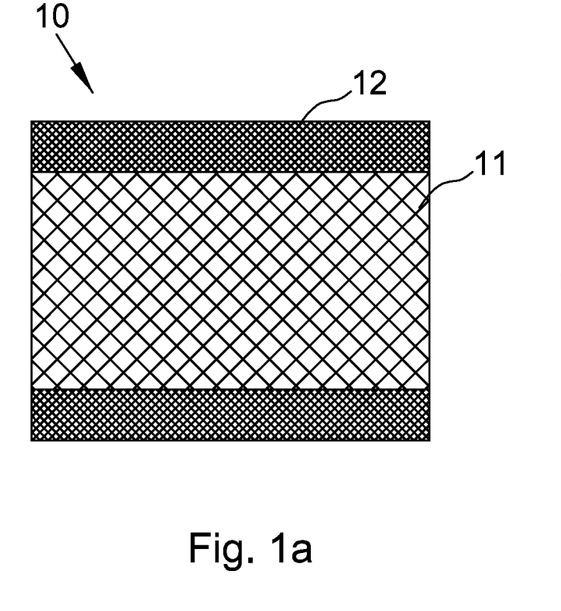
FIG. 1a illustrates schematically a side-view of a first embodiment of a tubular mesh support device according to the present invention.
Figure 1B:
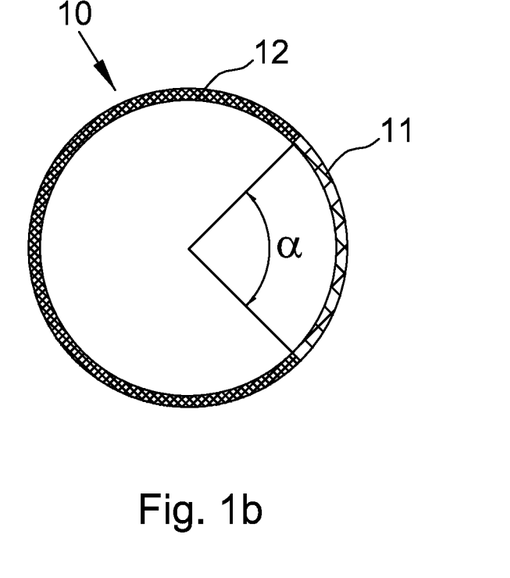

A mesh support device 10 according to a first embodiment of the present invention is schematically depicted in FIG. 1a and FIG. 1b, where FIG. 1a shows the mesh support device 10 in a side-view and FIG. 1b shows the support device 10 in a cross-sectional view seen from above (or from below). For clarity of illustration only, the mesh support device 10 has in FIG. 1b been given a considerably enlarged wall-thickness. As can be seen from FIG. 1a, the mesh support device 10 is an elongated object with a length that extends in a longitudinal direction indicated by the longitudinal axis Y; and FIG. 1b shows that the mesh support device has a circular cross-section, i.e. the mesh support device 10 is a tubular object, where the meaning of the term "tubular" has been defined above.

It can further be seen in FIG. 1a that the mesh support device 10 comprises two circumferential mesh areas, a first circumferential mesh area 11 and a second circumferential mesh area 12. Further, as can be seen in FIG. 1b, the circumferential length of the first circumferential area 11, herein interchangeably called the first circumferential length, is defined by an angle $\alpha$ and the circumferential length of the second circumferential area 12, herein interchangeably called the second circumferential length, is defined by 360°-α, where, according to the invention, α is in the interval of 20°<α<180°, and more preferably 60°<α<180°, and even more preferably 80°<α<180°. Each of the first circumferential length and the second circumferential length forms a part of the total circumferential length of the mesh support device 10.

According to the invention, the first circumferential mesh area 11 is characterized by a first set of mesh characteristics and the second circumferential mesh area 12 is characterized by a second set of mesh characteristics, which second set of mesh characteristics is different from the first set of mesh characteristics. By this division of the mesh support device 10 into two circumferential mesh areas 11, 12 having different mesh characteristics, one circumferential mesh area, e.g. the first circumferential mesh area 11, can be adapted to meet specific requirements on the mesh support device, while the other circumferential mesh area, e.g. the second circumferential mesh area 12, can be adapted to meet other specific requirements. The first set of mesh characteristics can, for example, comprise high distension, e.g. an initial distension higher than 8%, measured at 72 N as measured using a universal testing equipment equipped with a ball burst fixture as described in the standard ASTM D3787, such that the mesh support device 10 can accommodate a variety of breast implant sizes, while the second set of mesh characteristics can, for example, comprise low distension, e.g. an initial distension lower than 8%, measured according to the standard ASTM D3787, such that the tissue being in contact with the second circumferential mesh area 12 experiences a stable, non-stretching mesh, which facilitates stable fixation of the mesh support device and a breast implant by the use of, e.g., sutures or staples. The stable, non-stretching circumferential mesh area further stabilizes the breast implant during the early healing period to avoid lateral movements or bottoming out due to vertical movements. To accomplish the low distension, the second circumferential mesh area 12 can be knitted from a second set of fibers interlaced with those fibers used to knit the first circumferential mesh area 11. The second circumferential mesh area 12 can comprise fibers that have at least one set of characteristics which makes them degrade within a shorter time period than the first set of fibers. Some fibers having a shorter degradation period will promote deposition of new collagen, which is especially interesting on the anterior side facing the tiny flap after removal of the carcinogenic tissue. This will promote a faster regeneration of new tissue, which will support the breast implant when the mesh has fully degraded. According to the invention, the second set of mesh characteristics can comprise that the time of onset of decline of mechanical properties is less than 30 days, and more preferably less than 14 days, after implantation. To promote tissue integration, the second set of mesh characteristics comprises an area density within the interval of 40 to 180 g/cm$^2$, and more preferably within the interval of 60 to 160 g/cm$^2$. Preferably the area density of the second circumferential mesh area 12 is at least 30% higher than the area density of the first circumferential mesh area 11, and more preferably 50% and even more preferably 70% higher than the area density of the first circumferential mesh area 11. As an example, when a breast implant has been positioned within the mesh support device 10, the first circumferential mesh area 11 can be arranged such that it covers the flat backside of the breast implant, while the second circumferential mesh area 12 covers the rounded front side of the breast implant.

The mesh support device 10, i.e. the first and second circumferential mesh areas 11, 12 can be made by means of any known knitting or weaving technique, and it is preferred that the mesh for the support device 10 is made by a technique that prevents unraveling of the mesh support device 10. One example of such a knitting technique is warp-knitting, which is a family of knitting methods in which the yarn zigzags along the length of the fabric, i.e. following adjacent columns of knitting rather than a single row. By using a manufacturing method that prevents, or at least reduces the risk of, unraveling, the mesh support device can be more reliably anchored (e.g. stitched, sewed, sutured or stapled) to the human breast tissue during and after implantation of a breast implant. A number of various warp-knitting patterns can be used to achieve the properties described herein; and, for example, the first circumferential mesh area can be made by atlas knitting, or different patterns of net-knitting using pillar stich only can be used to achieve the higher distension. The second circumferential mesh area can be exemplified with addition of two bars on the warp knitting machine, one which is programmed to do inlay or marquisette pattern while the other bar is programmed to do pillar stich which interlaces with the inlay or marquisette pattern. The examples of the various stitch pattern that can be used to accomplish the characteristics defined for the first and second circumferential mesh areas, respectively, are examples out of numerous other combinations which can be used depending on the final characteristics in any particular product described herein.

In a preferred embodiment, the mesh support device 10, i.e. the first and second circumferential mesh areas 11, 12 are made from a degradable material, and preferably from a bio-degradable material, which means that the material in question can be resorbed by the human body. By using a degradable material, which degrades inside the body, complications that are known to sometimes be associated with permanent mesh products can be avoided. Such degradable materials which are being degraded and fully assimilated or excreted from the body are also known as resorbable polymers and have been used for years in numerous medical devices. These materials are, but not limited to, usually made from lactides, glycolide, trimethylene carbonate, para-dioxanone and ε-caprolactone. Examples of materials in the fibers or yarns that constitute the mesh of the mesh support device 10 are (a) resorbable polymers with a relatively short degradation time, and non-limiting examples are polymers or copolymers made from the monomer glycolide in pure form, or in combination with paradioxanone, lactide, trimethylene carbonate or ε-caprolactone, or polymers or copolymers made from the monomer para-dioxanone in its pure form, or in combination with lactide, trimethylene carbonate or caprolactone; or (b) resorbable polymers with a relatively long degradation time, and non-limiting examples are polymers or copolymers made from lactide in combination with any of the monomers para-dioxanone, trimethylene carbonate or ε-caprolactone or even copolymer containing less than 20% glycolide. Other polymer that can be used and which may be of particular interest for some of the mentioned characteristics of the first circumferential mesh area is poly-γ-hydroxybutyrate, polyurethanes, e.g. polyureaurethanes, polyesterurethanes and polycarbonateurethanes; or (c) any combinations thereof.

As indicated above, several materials can be combined in a single mesh support device according to the present invention, and a suitable mesh is commercially available under the tradename TIGR® Matrix Surgical Mesh and is sold by the company Novus Scientific. This mesh, which is described in U.S. Pat. Nos. 9,566,370, 8,083,755 and 8,016,841, comprises two different polymers having different degradation times, and it is believed that the resulting gradual degradation can promote tissue integration of a mesh support device made by this particular mesh; and it is believed that at least the second circumferential mesh area, when it is adapted to promote tissue integration and/or tissue regeneration comprises this kind of mesh. However, although synthetic and degradable materials are believed to be advantageous, a mesh support device according to the present invention can be made from permanent (non-degradable, non-resorbable) synthetic materials or even from biological materials, and any combination thereof.

Figure 2A:
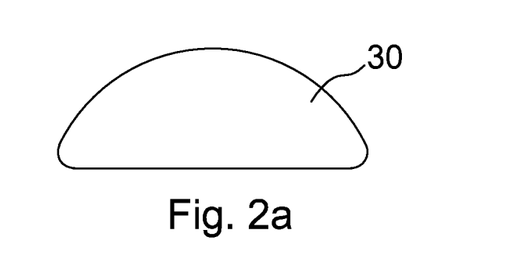
FIG. 2a illustrates schematically a side-view of a breast implant.
Figure 2B:
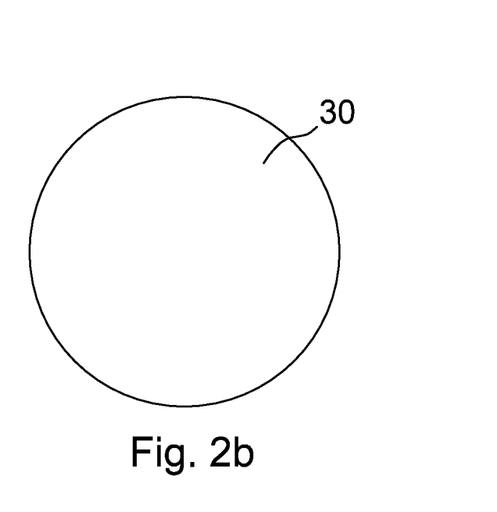

The mesh support device 10 is intended to be used together with a breast implant, and in FIG. 2a and FIG. 2b, an example of such a breast implant 30 is schematically illustrated, where the breast implant 30 is shown in a cross-sectional side-view in FIG. 2a and in a top-view in FIG. 2b. The breast implant 30, which, for example, can be made from silicone or saline, or a combination thereof, has a generally hemispherical shape with a rounded and convex upper part, also referred to as frontside, which, when implanted, is protruding forward from the human breast area, and an essentially flat lower part, also referred to as the backside, which, when implanted, rests against tissue, e.g. the breast muscle, located in the human breast area.

Figure 3A:
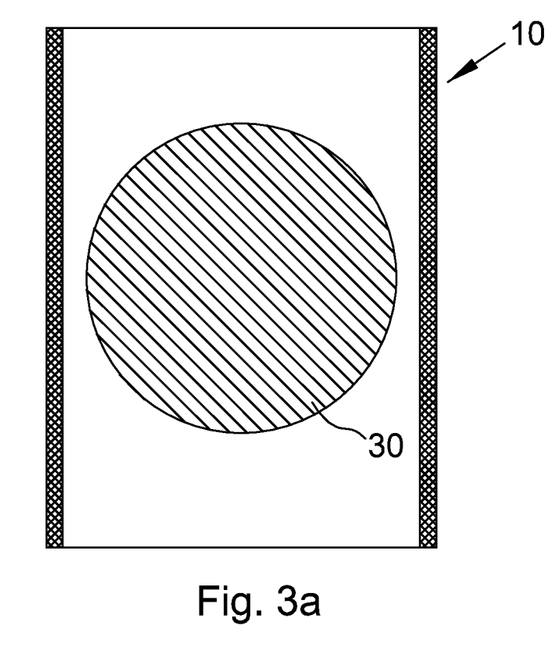
FIG. 3a illustrates schematically an intermediate configuration for a breast implant device comprising the breast implant of FIGS. 2a-b and the tubular mesh support device of FIGS. 1a-b.
Figure 3B:
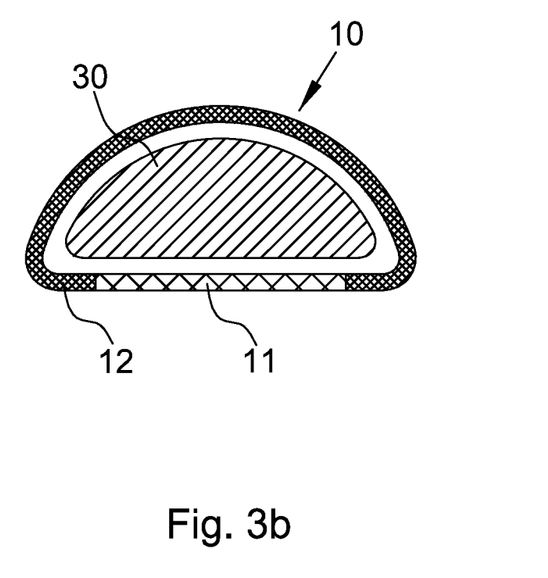

FIG. 3a illustrates in one view how the breast implant 30 is positioned inside the mesh support device 10, and it can be seen that the breast implant 30 is placed such that a rim of the breast implant 30 is directed along the longitudinal axis Y of the mesh support device 10 and that the upper side or frontside of the breast implant 30 points in a direction that is transverse to the longitudinal axis Y. In one embodiment of the invention, as illustrated in FIG. 3b, the support device 10 can be arranged such that a first circumferential mesh area 11, which comprises mesh characteristics that can accommodate a large variety of breast implant sizes, covers the backside of the breast implant, while a second circumferential mesh area 12, which comprises mesh characteristics that promote tissue integration and/or tissue regeneration, covers the frontside of the breast implant.

Figure 3C:
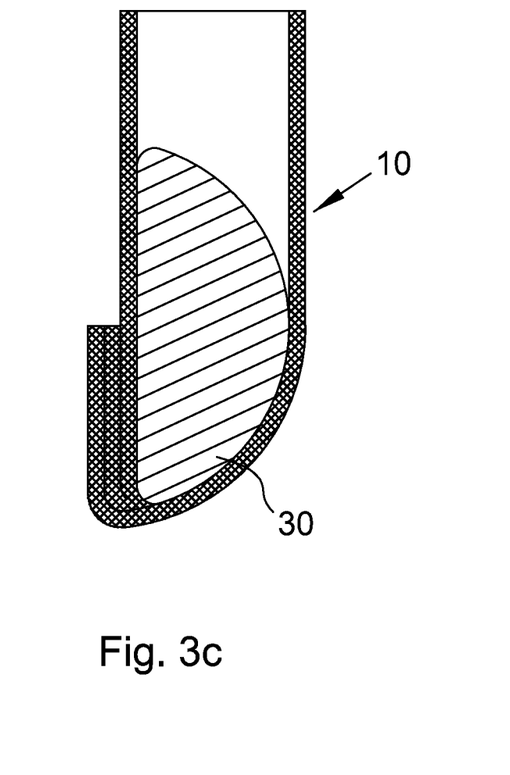
FIG. 3c illustrates schematically a final configuration for the breast implant device comprising the breast implant of FIGS. 2a-b and the mesh support device of FIGS. 1a-b.

FIG. 3c illustrates from another view the position of the breast implant 30 within the mesh support device 10. Here, the breast implant 30 is arranged such that a first or lower portion of the mesh support device 10 extends a distance outside the rim of the breast implant 30. By this arrangement, the first or lower portion of the mesh support device 10 can be folded backwards to lie essentially flat and parallel with the backside of the breast implant 30; and it can further be seen that by folding the lower portion of the mesh support device 10 backwards, the breast implant 30 is firmly supported by the lower portion of the mesh support device. Thus, by providing a mesh support device, which, in accordance with the present invention, has a tubular shape, and a breast implant, which is correctly positioned within the mesh support device (i.e. such that a first or lower portion of the mesh support device extends beyond a (lower) rim of the breast implant), a lower part of the breast implant fits snuggly in a lower portion of the mesh support device although the relative sizes and shapes of the breast implant and the mesh support device, respectively, are not perfectly adapted to each other. This contrasts with support devices having a pocket-shaped receiving space, where there is typically an empty area, i.e. a mismatch, between a breast implant and the support device at the area where a backside of the support device meets a frontside thereof.

Figure 4:
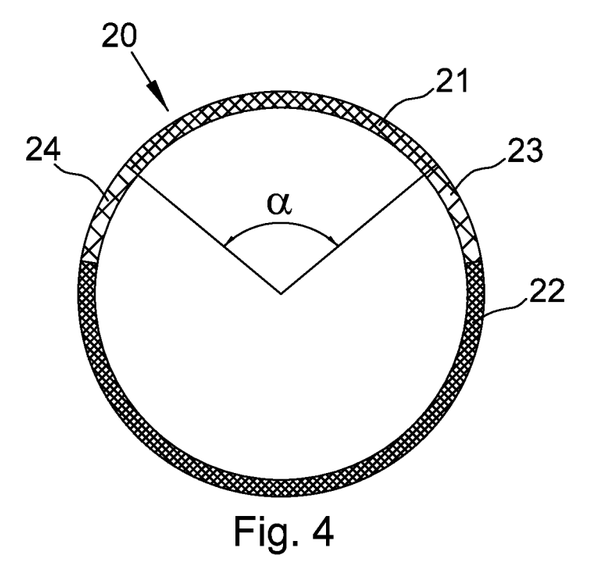
FIG. 4 illustrates schematically a cross-sectional top-view of a second embodiment of a tubular mesh support device.

As was mentioned above, a mesh support device according to the invention can comprise more than two different circumferential mesh areas, e.g. three, four, five, or in principle any number of circumferential mesh areas, which all are characterized by different sets of mesh characteristics. Alternatively, a mesh support device according to the invention can comprise more than two different circumferential mesh areas, where at least two, or more, circumferential mesh areas are characterized by the same set of mesh characteristics. FIG. 4 illustrates schematically an example of the latter and shows a second embodiment of a mesh support device 20 according to the invention. The mesh support device 20 comprises a first circumferential mesh area 21, which is characterized by a first set of mesh characteristics and which has a first circumferential length, a second circumferential mesh area 22, which is characterized by a second set of mesh characteristics and which has a second circumferential length, the second set of mesh characteristics being different from the first set of mesh characteristics, a third circumferential mesh area 23, which is characterized by a third set of mesh characteristics and which has a third circumferential length, the third set of mesh characteristics being different from both the first set of mesh characteristics and from the second set of mesh characteristics, and a fourth circumferential mesh area 24, which is characterized by said third set of mesh characteristics and which has a fourth circumferential length, where the third circumferential mesh area 23 and the fourth circumferential mesh area 24 are located on opposite sides of the first circumferential mesh area 21. Each of the first circumferential length, the second circumferential length, the third circumferential length, and the fourth circumferential length, forms a part of the total circumferential length of the mesh support device 20. The circumferential length of the third circumferential mesh area 23 and of the fourth circumferential mesh area 24 can be in the interval of 0.2 cm to 5 cm and more preferably in the interval of 1 cm to 3 cm. That is, each of the third circumferential length and the fourth circumferential length can be in the interval of 0.2 cm to 5 cm and more preferably in the interval of 1 cm to 3 cm. Thus, in this embodiment, the third and fourth circumferential mesh areas 23, 24 have the same characteristics and can, for example, be tailored to provide good strength in a lateral and/or vertical direction when the mesh support device 20 is arranged such that a rim of a breast implant is covered by the third and fourth circumferential mesh areas 23, 24. As an example, so-called pillar stich is a knitting-method that provide good mesh strength in a vertical direction and can be used for the third and fourth circumferential mesh areas 23, 24. Thus, in this second embodiment, the third and fourth circumferential mesh areas 23, 24 encloses the first circumferential mesh area 21; and according to the invention, several circumferential mesh areas, which are characterized by a set of mesh characteristics that enhances adaption to different breast implant sizes, e.g. a distension higher than 8%, can be arranged in between several circumferential mesh areas, which are characterized by a set of mesh characteristics that prevents lateral or vertical movement of a breast implant, e.g. pillar stitch. Thus, in this case, there is an alternating or repeating arrangement of circumferential mesh areas with high distension and circumferential mesh areas with characteristics that withstand vertical and/or lateral (horizontal) movement of a breast implant. Everything that was mentioned above regarding materials and manufacturing techniques for a mesh support device according to the invention is also applicable for a mesh support device comprising more than two circumferential mesh areas.

For all embodiments presented herein, a tubular mesh support device can be knitted on a knitting machine that produces tubular meshes. An example of such a knitting machine is a warp-knitting machines equipped with two needle beds and at least 7 or 8 guide bars. Another possibility is to knit or weave a planar mesh, whose opposite edges subsequently are sewn together to produce a tubular mesh support device.

Although the present invention has been described with reference to specific embodiments, also shown in the appended drawings, it will be apparent to those skilled in the art that many variations and modifications can be done within the scope of the invention as described in the specification and defined with reference to the claims below.

The invention claimed is:

1. A mesh support device for supporting a breast implant, wherein;
the mesh support device is tubular and comprises:
a first circumferential mesh area, which is characterized by a first set of mesh characteristics and which has a first circumferential length, and
a second circumferential mesh area, which is characterized by a second set of mesh characteristics and which has a second circumferential length,
the first set of mesh characteristics is different from the second set of mesh characteristics,
each of the first circumferential length and the second circumferential length forms a part of the total circumferential length of the mesh support device, and
the first circumferential length of the first circumferential mesh area is defined by an angle α and that the second circumferential length of the second circumferential mesh area is defined by 360°-α, which angle α is in the interval of 20°<α<180°.

2. The mesh support device according to claim 1, wherein 60°<α<180°.

3. The mesh support device according to claim 1, wherein the first set of mesh characteristics comprises distension and said distension is higher than 8%.

4. The mesh support device according to claim 1, wherein the second set of mesh characteristics comprises distension and said distension is less than 8%.

5. The mesh support device according claim 1, wherein the second set of mesh characteristics comprises area density and said area density is within the interval of 40 to 180 g/cm².

6. The mesh support device according to claim 1, wherein the first circumferential mesh area and the second circumferential mesh area are made by a knitting or weaving technique that prevents unraveling.

7. The mesh support device according to claim 1, wherein the mesh support device is made from a bio-degradable material.

8. The mesh support device according to claim 1, wherein at least the second circumferential mesh area is made from at least two bio-degradable materials having different degradation times.

9. The mesh support device according to claim 1, wherein:
the mesh support device comprises;
a third circumferential mesh area, which is characterized by a third set of mesh characteristics and which has a third circumferential length, and
a fourth circumferential mesh area, which is characterized by said third set of mesh characteristics and which has a fourth circumferential length,
the third set of mesh characteristics is different from the first set of mesh characteristics and from the second set of mesh characteristics,
the third circumferential mesh area and the fourth circumferential mesh area are located on opposite sides of the first circumferential mesh area, and
each of the third circumferential length and the fourth circumferential length forms a part of the total circumferential length of the mesh support device.

10. A breast implant device for implantation in a human body, comprising:
a breast implant; and
a mesh support device, in which the breast implant is positioned, wherein:
the mesh support device is tubular and comprises:
a first circumferential mesh area, which is characterized by a first set of mesh characteristics and which has a first circumferential length, and
a second mesh circumferential area, which is characterized by a second set of mesh characteristics and which has a second circumferential length,
the first set of mesh characteristics is different from the second set of mesh characteristics,
each of the first circumferential length and the second circumferential length forms a part of the total circumferential length of the mesh support device, and
the first circumferential length of the first circumferential mesh area is defined by an angle α and that the second circumferential length of the second circumferential mesh area is defined by 360°-α, which angle α is in the interval of 200<α<180°.

11. The breast implant device according to claim 10, wherein the breast implant has a rounded frontside and an essentially flat backside and that the mesh support device covers both the frontside and the backside and has been folded backwards to lie essentially parallel with the backside of the breast implant.

12. The breast implant device according to claim 11, wherein the first circumferential mesh area covers the frontside of the breast implant and the second circumferential mesh area covers the backside of the breast implant.

13. A mesh support device for supporting a breast implant, wherein:
the mesh support device is tubular and comprises:
a first circumferential mesh area, which is characterized by a first set of mesh characteristics and which has a first circumferential length, and
a second circumferential mesh area, which is characterized by a second set of mesh characteristics and which has a second circumferential length,
the first set of mesh characteristics is different from the second set of mesh characteristics,
each of the first circumferential length and the second circumferential length forms a part of the total circumferential length of the mesh support device, and
the first set of mesh characteristics comprises distension and said distension is higher than 8%.

14. The mesh support device according to claim 13, wherein the second set of mesh characteristics comprises distension and said distension is less than 8%.

15. A mesh support device for supporting a breast implant, wherein:
the mesh support device is tubular and comprises:

a first circumferential mesh area, which is characterized by a first set of mesh characteristics and which has a first circumferential length, and a second circumferential mesh area, which is characterized by a second set of mesh characteristics and which has a second circumferential length, the first set of mesh characteristics is different from the second set of mesh characteristics, each of the first circumferential length and the second circumferential length forms a part of the total circumferential length of the mesh support device, and the second set of mesh characteristics comprises distension and said distension is less than 8%.

16. A mesh support device for supporting a breast implant, wherein:

the mesh support device is tubular and comprises:

a first circumferential mesh area, which is characterized by a first set of mesh characteristics and which has a first circumferential length, and a second circumferential mesh area, which is characterized by a second set of mesh characteristics and which has a second circumferential length, the first set of mesh characteristics is different from the second set of mesh characteristics, each of the first circumferential length and the second circumferential length forms a part of the total circumferential length of the mesh support device, and the second set of mesh characteristics comprises area density and said area density is within the interval of 40 to 180 g/cm$^2$.

17. The mesh support device according to claim 16, wherein the area density of the second circumferential mesh area is at least 30% higher than an area density of the first circumferential mesh area.

18. A mesh support device for supporting a breast implant, wherein:

the mesh support device is tubular and comprises:

a first circumferential mesh area, which is characterized by a first set of mesh characteristics and which has a first circumferential length, a second circumferential mesh area, which is characterized by a second set of mesh characteristics and which has a second circumferential length, a third circumferential mesh area, which is characterized by a third set of mesh characteristics and which has a third circumferential length, and a fourth circumferential mesh area, which is characterized by said third set of mesh characteristics and which has a fourth circumferential length, the first set of mesh characteristics is different from the second set of mesh characteristics, the third set of mesh characteristics is different from the first set of mesh characteristics and from the second set of mesh characteristics, the third circumferential mesh area and the fourth circumferential mesh area are located on opposite sides of the first circumferential mesh area, and each of the first circumferential length, the second circumferential length, the third circumferential length and the fourth circumferential length forms a part of the total circumferential length of the mesh support device.

* * * * *